United States Patent
Park et al.

(10) Patent No.: US 11,668,642 B2
(45) Date of Patent: Jun. 6, 2023

(54) METHOD OF MEASURING ADHESIVE STRENGTH

(71) Applicant: Samsung Display Co., Ltd., Yongin-Si (KR)

(72) Inventors: Han Ho Park, Yongin-si (KR); Hyung-Don Na, Seoul (KR); Kyung Jun Park, Hwaseong-si (KR); Eun Ji Park, Suwon-si (KR); Chang Seob Jung, Icheon-si (KR); Hyeon Deuk Hwang, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 279 days.

(21) Appl. No.: 17/182,707

(22) Filed: Feb. 23, 2021

(65) Prior Publication Data

US 2021/0364416 A1    Nov. 25, 2021

(30) Foreign Application Priority Data

May 25, 2020   (KR) .......................... 10-2020-0062404

(51) Int. Cl.
   *G01N 19/04*   (2006.01)
(52) U.S. Cl.
   CPC ..... *G01N 19/04* (2013.01); *G01N 2203/0091* (2013.01)

(58) Field of Classification Search
   CPC ........... G01N 19/04; G01N 2203/0091; G01N 1/2813; G01N 3/08; G01N 2001/2833
   See application file for complete search history.

(56) References Cited

FOREIGN PATENT DOCUMENTS

| CN | 104677823 A | * | 6/2015 | ............. G01N 19/04 |
| JP | 4185851 B2 | | 11/2008 | |
| JP | 2014019777 A | | 2/2014 | |
| KR | 1020150102694 A | | 9/2015 | |

* cited by examiner

*Primary Examiner* — Jonathan M Dunlap
(74) *Attorney, Agent, or Firm* — Cantor Colburn LLP

(57) ABSTRACT

A method of measuring adhesive strength includes setting an evaluation time ($t_e$), fixing a substrate and an adhesive member to a measurement device, pulling the adhesive member fixed to the measurement device with a first measurement force ($F_{e1}$) for the evaluation time ($t_e$), pulling the adhesive member fixed to the measurement device is pulled with a second measurement force ($F_{e2}$), which is obtained by increasing the first measurement force ($F_{e1}$) by a preset amount, for the evaluation time ($t_e$), and determining a reference measurement force ($F_{es}$) which is a static force applied to the adhesive member when a distance by which a first portion of the adhesive member is detached from the substrate is equal to a preset distance ($d_t$) is determined.

20 Claims, 17 Drawing Sheets

FIG. 1
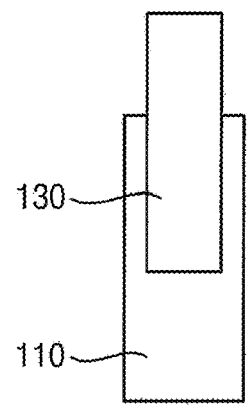
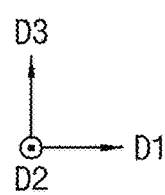
FIG. 2
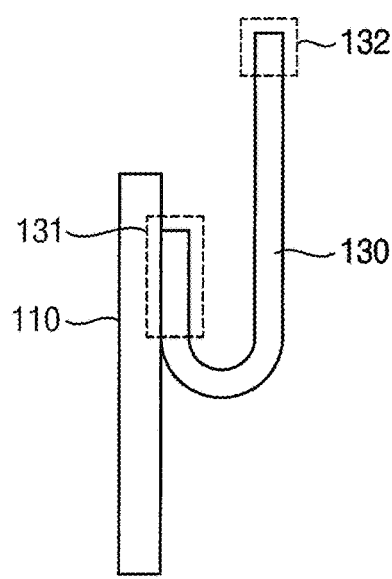
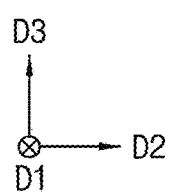

FIG. 4
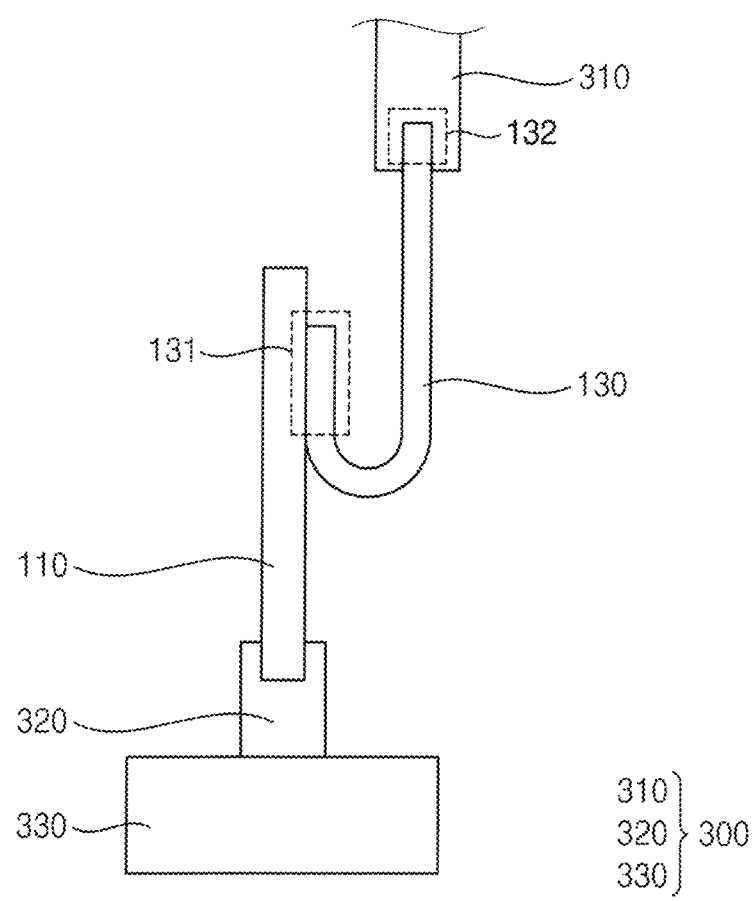
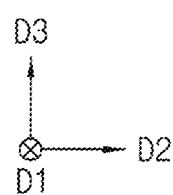

FIG. 6
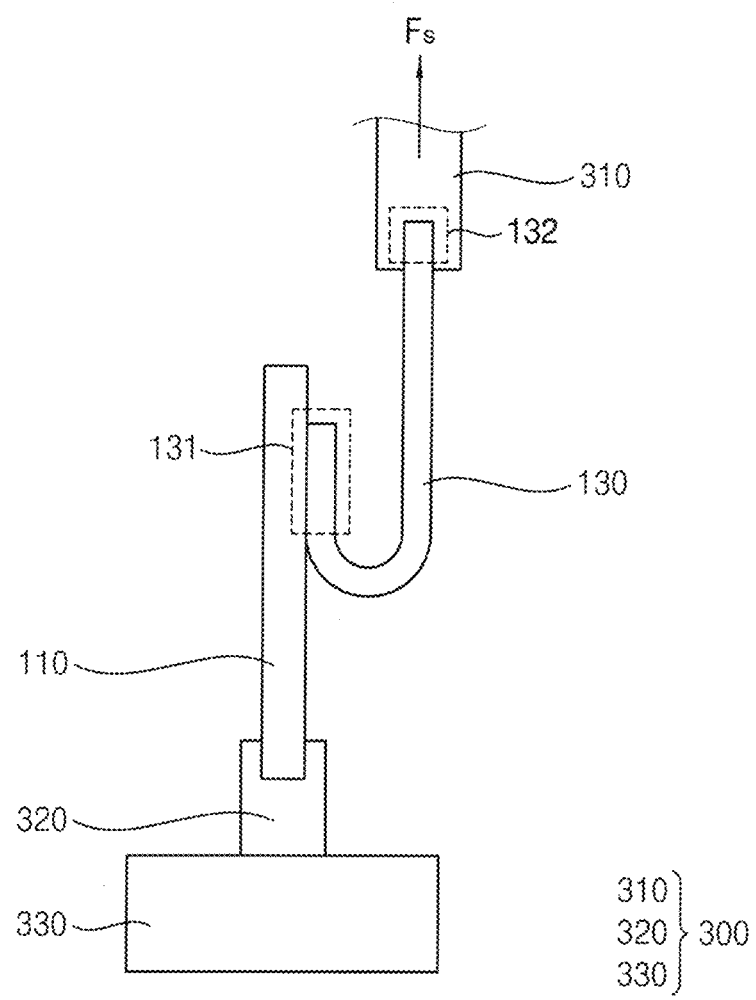
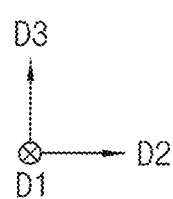

ically to a device and a method of measuring adhesive strength. More particularly, embodiments of the present inventive concept relate to a method of measuring adhesive strength by using adhesion maintenance capability.

METHOD OF MEASURING ADHESIVE STRENGTH

This application claims priority to Korean Patent Application No. 10-2020-0062404 filed on May 25, 2020, and all the benefits accruing therefrom under 35 U.S.C. § 119, the content of which in its entirety is herein incorporated by reference.

BACKGROUND

1. Field

Embodiments relate generally to a device and a method of measuring adhesive strength. More particularly, embodiments of the present inventive concept relate to a method of measuring adhesive strength by using adhesion maintenance capability.

2. Description of the Related Art

A display device may include various adhesive members (or bonding members). For example, adhesive members having adhesive strength, such as a protective film, an optical clear adhesive ("OCA"), a pressure-sensitive adhesive ("PSA"), an optical clear resin ("OCR"), an anisotropic conducting film ("ACF"), and a double-sided fixing tape, may be included in the display device. The adhesive members as described above may have various adhesive properties according to the purpose of use.

The adhesive strength of the adhesive member may be measured by using a peel strength scheme of measuring an average value of a force applied during a peeling interval, a probe tack scheme of measuring a maximum force applied per unit area during peeling, a shear stress scheme of measuring a shear strain, a holding power scheme of measuring a degree of withstanding a predetermined weight for a predetermined time, and the like.

SUMMARY

The adhesive members may be applied to the display device with reference to the above measurement schemes. However, even if the adhesive member selected with reference to the above measurement schemes is applied to the display device, a defect of the adhesive member, such as residues (e.g., remainders) left on an adhesive surface or inability to maintain the adhesive strength when the adhesive member is bent or repeatedly folded, may occur, so that a new method of measuring adhesive strength of an adhesive member is desirable.

Some embodiments provide a method of measuring adhesive strength by using adhesion maintenance capability.

According to some embodiments, a method of measuring adhesive strength includes setting an evaluation time (te), fixing a substrate and an adhesive member to a measurement device, pulling the adhesive member fixed to the measurement device with a first measurement force (Fe1) for the evaluation time (te), pulling the adhesive member fixed to the measurement device is pulled with a second measurement force (Fe2), which is obtained by increasing the first measurement force (Fe1) by a preset amount, for the evaluation time (te), and determining a reference measurement force (Fes) which is a static force applied to the adhesive member when a distance by which a first portion of the adhesive member is detached from the substrate is equal to a preset distance (dt) is determined In embodiments, the method may further include, after the pulling of the adhesive member fixed to the measurement device with the first measurement force ($F_{e1}$) for the evaluation time ($t_e$), measuring the distance by which the first portion of the adhesive member is detached from the substrate.

In embodiments, the method may further include, after the measuring of the distance by which the first portion of the adhesive member is detached from the substrate, comparing the distance by which the first portion of the adhesive member is detached from the substrate with the preset distance ($d_t$).

In embodiments, in the pulling of the adhesive member fixed to the measurement device with the first measurement force ($F_{e1}$) for the evaluation time ($t_e$), the pulling force may increase from 0 to the first measurement force ($F_{e1}$), and then the first measurement force ($F_{e1}$) may be maintained constant during the evaluation time ($t_e$).

In embodiments, the method may further include, before the pulling of the adhesive member fixed to the measurement device with the second measurement force ($F_{e2}$), which is obtained by increasing the first measurement force ($F_{e1}$) by the preset amount, for the evaluation time ($t_e$), re-fixing the substrate and the adhesive member to the measurement device.

In embodiments, the method may further include, after the pulling of the adhesive member fixed to the measurement device with the second measurement force ($F_{e2}$), which is obtained by increasing the first measurement force ($F_{e1}$) by the preset amount, for the evaluation time ($t_e$), measuring the distance by which the first portion of the adhesive member is detached from the substrate.

In embodiments, the method may further include, after the measuring of the distance by which the first portion of the adhesive member is detached from the substrate, comparing the distance by which the first portion of the adhesive member is detached from the substrate with the preset distance ($d_t$).

In embodiments, in the pulling of the adhesive member fixed to the measurement device with the second measurement force ($F_{e2}$) for the evaluation time ($t_e$), the pulling force may increase from 0 to the second measurement force ($F_{e2}$), and then the second measurement force ($F_{e2}$) may be maintained constant during the evaluation time ($t_e$).

In embodiments, the pulling of the adhesive member with the first measurement force ($F_{e1}$) and the pulling of the adhesive member with the second measurement force ($F_{e2}$) may be independently performed.

In embodiments, in the pulling of the adhesive member with the first measurement force ($F_{e1}$) and the pulling of the adhesive member with the second measurement force ($F_{e2}$), the first portion of the adhesive member may be adhered to a part of a major surface of the substrate through adhesive strength of the adhesive member, a portion adjacent to the first portion of the adhesive member may be bent such that a second portion of the adhesive member is fixed to a first fixing part of the measurement device, and the first fixing part may pull the second portion of the adhesive member with the first measurement force ($F_{e1}$) or the second measurement force ($F_{e2}$).

In embodiments, the setting of the evaluation time ($t_e$) may include adhering the first portion of the adhesive member to the substrate, fixing a second portion of the adhesive member to a first fixing part of the measurement device, and fixing the substrate to a second fixing part of the measurement device, pulling the second portion of the adhesive member fixed by the first fixing part of the measurement device with a reference force ($F_S$), measuring a distance ($d_n$) by which the first portion of the adhesive member is detached from the substrate according to a time ($t_n$), determining a time interval in which a ratio of a variation ($\Delta d$) of the distance ($d_n$) to a variation ($\Delta t$) of the time ($t_n$) is $10^{-5}$ or less, and setting the evaluation time ($t_e$) based on the time interval.

In embodiments, the reference force ($F_S$) may be $10^{-1}$ of adhesive strength of the adhesive member.

In embodiments, the reference force ($F_S$) may be equal to adhesive strength of the adhesive member.

In embodiments, in the pulling of the second portion of the adhesive member fixed by the first fixing part of the measurement device with the reference force ($F_S$), the pulling force may increase from 0 to the reference force ($F_S$), and then the reference force ($F_S$) may be maintained constant.

In embodiments, the first portion of the adhesive member may be adhered to a part of a major surface of the substrate through adhesive strength of the adhesive member, and a portion adjacent to the first portion of the adhesive member may be bent such that the second portion of the adhesive member is fixed to the first fixing part of the measurement device. The first fixing part may pull the second portion of the adhesive member with the reference force ($F_S$).

In embodiments, the method may further include, before the setting of the evaluation time ($t_e$), measuring the adhesive strength of the adhesive member.

In embodiments, the fixing of the substrate and the adhesive member to the measurement device may include adhering the first portion of the adhesive member to the substrate and fixing a second portion of the adhesive member to a first fixing part of the measurement device, and fixing the substrate to a second fixing part of the measurement device.

In embodiments, the first portion of the adhesive member may be adhered to a part of a major surface of the substrate through adhesive strength of the adhesive member, and a portion adjacent to the first portion of the adhesive member may be bent such that the second portion of the adhesive member is fixed to the first fixing part of the measurement device.

In embodiments, the second fixing part of the measurement device may be fixed to the measurement device, and the second fixing part of the measurement device fixes the substrate. The first fixing part of the measurement device may pull the second portion of the adhesive member in a direction parallel to the major surface of the substrate.

In embodiments, when the distance by which the first portion of the adhesive member is detached from the substrate is less than or equal to the preset distance ($d_t$), a state in which the first portion of the adhesive member may be adhered to the substrate is maintained. When the distance by which the first portion of the adhesive member is detached from the substrate exceeds the preset distance ($d_t$), deformation of the first portion of the adhesive member may start.

In the method of measuring the adhesive strength according to embodiments of the present invention, the evaluation time may be set, and the distance by which the first portion of the adhesive member is detached from the substrate with a static force for the evaluation time may be measured, so that the reference measurement force of the adhesive member may be determined. The reference measurement force may include information on adhesion maintenance capability of the adhesive member as well as information on a force. Accordingly, an appropriate adhesive member may be selected according to application for the adhesive member, structural constraints, and design characteristics by using the method of measuring the adhesive strength, and an adhesion failure of the adhesive member included in the display device may be reduced.

BRIEF DESCRIPTION OF THE DRAWINGS

Embodiments can be understood in more detail from the following description taken in conjunction with the accompanying drawings, in which:

FIGS. 1 to 17 are views showing a method of measuring adhesive strength according to embodiments of the present invention.

DETAILED DESCRIPTION

Figure 3:
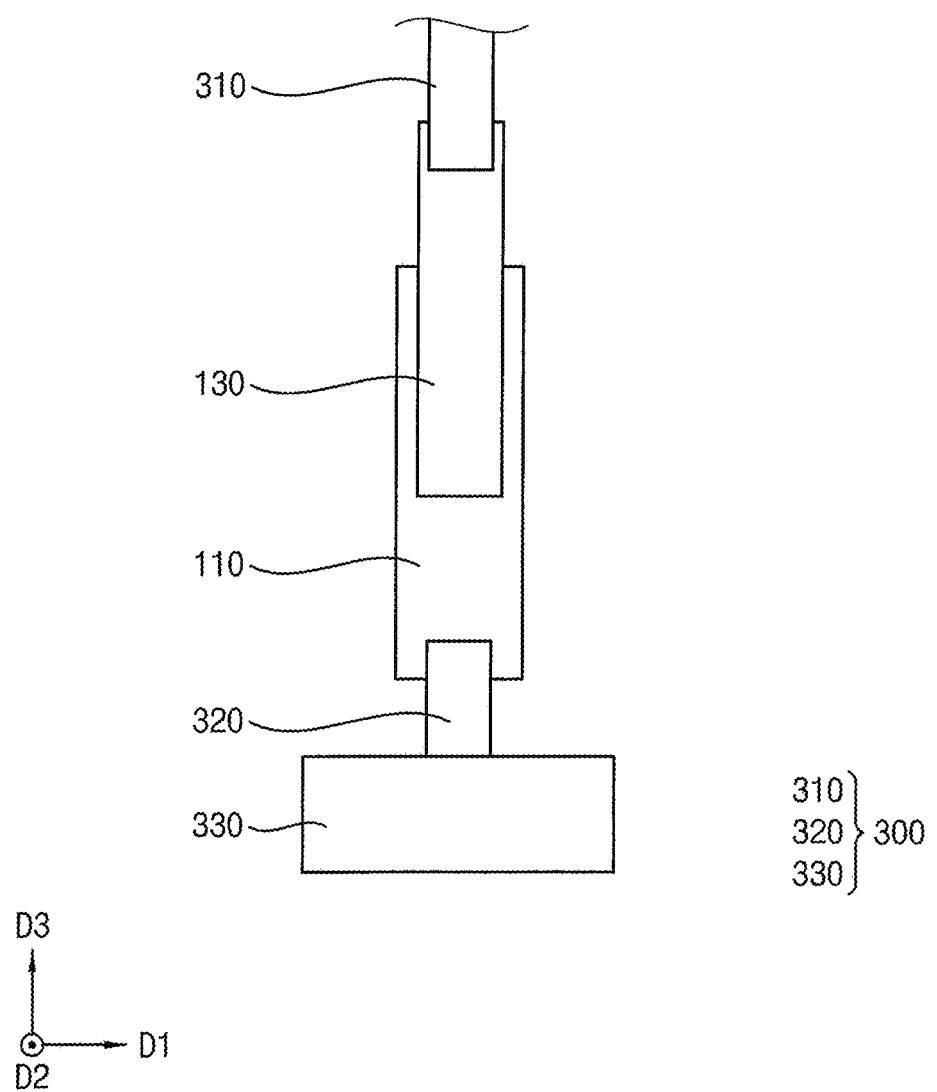

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Hereinafter, a method of measuring adhesive strength according to embodiments of the present invention will be described in detail with reference to the accompanying drawings. In the accompanying drawings, same or similar reference numerals refer to the same or similar elements.

Figure 17:
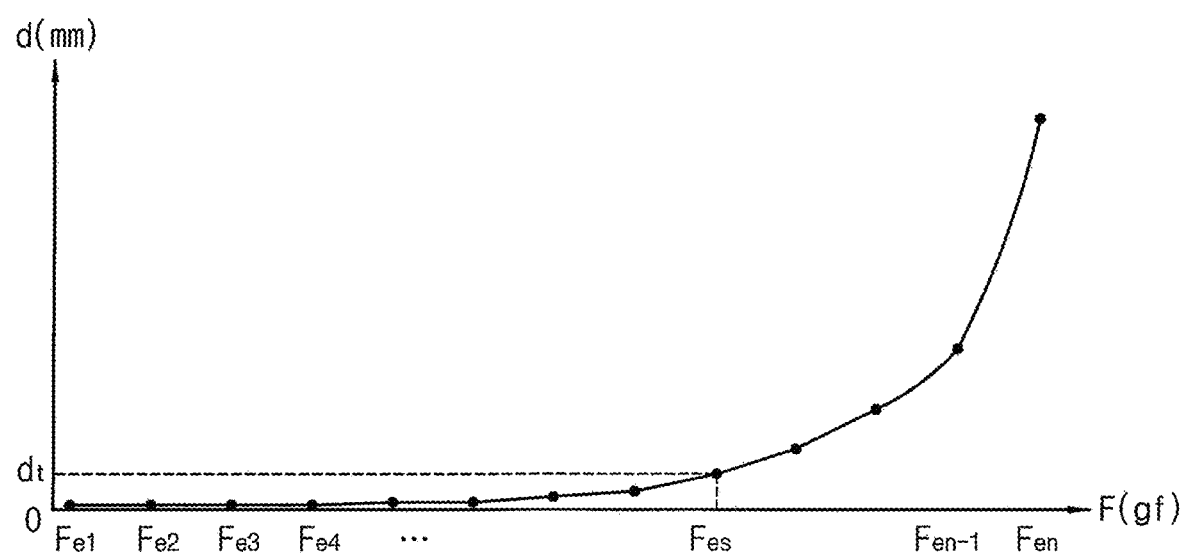
Figure 18:
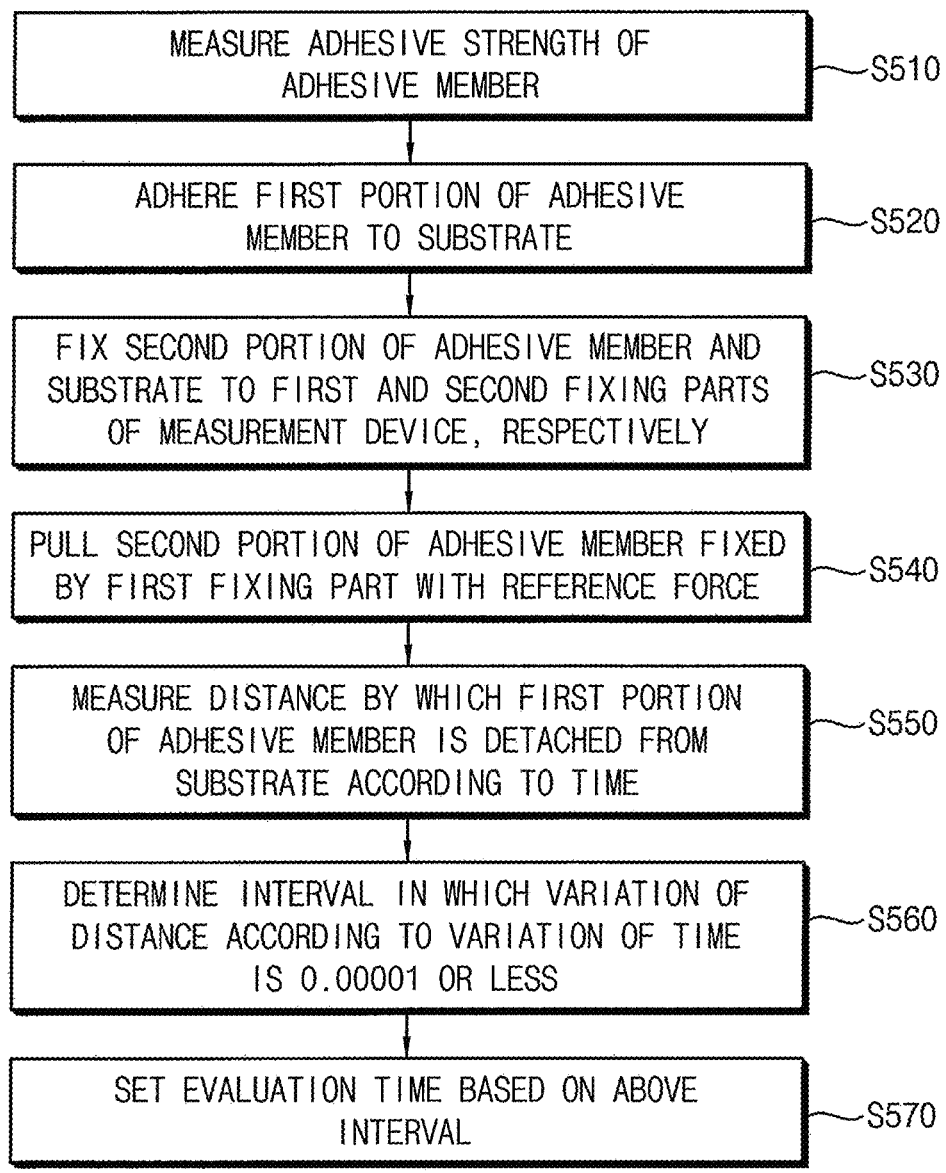
FIGS. 18 and 19 are flowcharts showing the method of measuring the adhesive strength according to the embodiments of the present invention.
Figure 19:
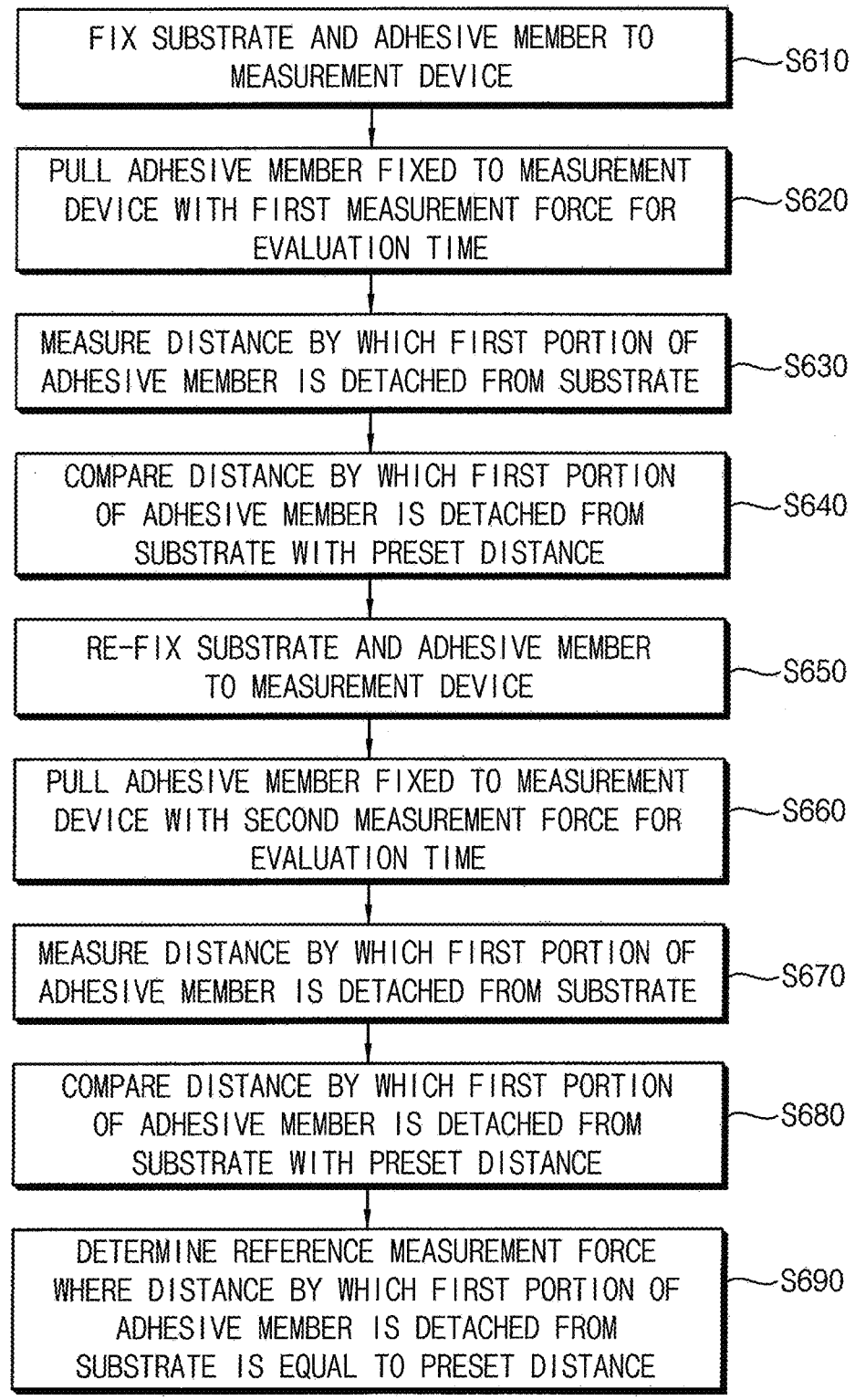

FIGS. 1 to 17 are views showing a method of measuring adhesive strength according to embodiments of the present invention, and FIGS. 18 and 19 are flowcharts showing the method of measuring the adhesive strength according to the embodiments of the present invention. For example, FIG. 18 is a flowchart corresponding to setting of an evaluation time, and FIG. 19 is a flowchart corresponding to determining of a reference measurement force based on the evaluation time.

Referring to FIGS. 1, 2, and 18, FIG. 1 is a front view showing an embodiment of a substrate 110 and an adhesive member 130, and FIG. 2 is a left side view showing the substrate 110 and the adhesive member 130 of FIG. 1.

Adhesive strength of the adhesive member 130 may be measured (S510). The adhesive strength of the adhesive member 130 may be measured by using a peel strength scheme of measuring an average value of a force applied during a peeling interval, a probe tack scheme of measuring a maximum force applied per unit area during peeling, a shear stress scheme of measuring a shear strain, a holding power scheme of measuring a degree of withstanding a predetermined weight for a predetermined time, or the like. In embodiments, an adhesive film having adhesive strength of approximately 5000 gram-force (gf)/25 millimeter (mm) may be used as the adhesive member 130. For example, the adhesive strength means that a force required to peel the adhesive film having a width of 25 mm is 5000 gf. In some embodiments, an adhesive film having adhesive strength different from the above adhesive strength may be used as the adhesive member 130. For example, the adhesive member 130 may include a base film, first and second adhesives, first and second release films, and the like. In this case, the base film may include a polyethylene terephthalate ("PET") film, and the like, each of the first and second adhesives may include urethane-based, acryl-based, and silicon-based adhesives, and each of the first and second release films may include a PET film. In addition, the first and second adhesives may be disposed on top and bottom surfaces of the base film, respectively, and the first and second release films may be disposed on the first and second adhesives to cover the first and second adhesives, respectively. In embodiments, the adhesive member 130 may include a first portion 131 and a second portion 132. For example, the first portion 131 of the adhesive member 130 and the second portion 132 of the adhesive member 130 may face each other.

The first portion 131 of the adhesive member 130 may be adhered to the substrate 110 (S520). For example, the first release film of the adhesive member 130 may be removed, and the first adhesive located in the first portion 131 of the adhesive member 130 may make contact with the substrate 110.

The first portion 131 of the adhesive member 130 may be adhered to a part of a top surface (i.e., one of major surfaces where the first portion 131 is attached as shown in FIG. 2) of the substrate 110 by the adhesive strength of the adhesive member 130, and a portion adjacent to the first portion 131 of the adhesive member 130 may be bent such that the adhesive member 130 may have a 'J' shape. In other words, the substrate 110 and the adhesive member 130 may correspond to 180 degrees (°) peel-off sampling. In some embodiments, the substrate 110 and the adhesive member 130 may be configured by 90° peel-off sampling according to a position of a first fixing part 310 of a measurement device 300 (See FIGS. 3 and 4). For example, when the angle between the first portion 131 and the second portion 132 is 180° like FIG. 2, it is 180° peel-off sampling, and, when the angle between the first portion 131 and the second portion 132 is 90° (not shown), it is 90° peel-off sampling. In other embodiments, the substrate 110 and the adhesive member 130 may be configured by area-contact sampling such as a flat punch scheme or a ball probe scheme according to a type of the measurement device 300. The substrate 110 may include a metal such as a steel use stainless ("SUS"), a metal alloy, or the like.

Referring to FIGS. 3, 4, and 18, FIG. 3 is a front view showing an embodiment of the substrate 110, the adhesive member 130, and the measurement device 300, and FIG. 4 is a left side view showing the substrate 110, the adhesive member 130, and the measurement device 300 of FIG. 3.

The measurement device 300 may include a first fixing part 310, a second fixing part 320, and a body 330. The body 330 may extend in a first direction D1 and a second direction D2 orthogonal to the first direction D1, and the second fixing part 320 may be located on a top surface of the body 330. In addition, the body 330 may extend in a third direction D3 perpendicular to the first direction D1 and the second direction D2 so as to be connected to the first fixing part 310. In this case, the second fixing part 320 may be fixed to the top surface of the body 330, and the first fixing part 310 may pull an object in the third direction D3 (e.g., a direction parallel to the top surface of the substrate 110). For example, the measurement device 300 may be a device configured to measure a tensile force.

The second portion 132 of the adhesive member 130 may be fixed to the first fixing part 310 of the measurement device 300, and the substrate 110 may be fixed to the second fixing part 320 of the measurement device 300 (S530). For example, the portion adjacent to the first portion 131 of the adhesive member 130 may be bent such that the second portion 132 of the adhesive member 130 may be fixed to the first fixing part 310 of the measurement device 300. In addition, a first side (i.e., the lower side in FIGS. 3 and 4) of the substrate 110 may be fixed to the second fixing part 320, and a second side (i.e., the upper side in FIGS. 3 and 4) of the substrate 110 may be adjacent to the first fixing part 310.

Figure 5:
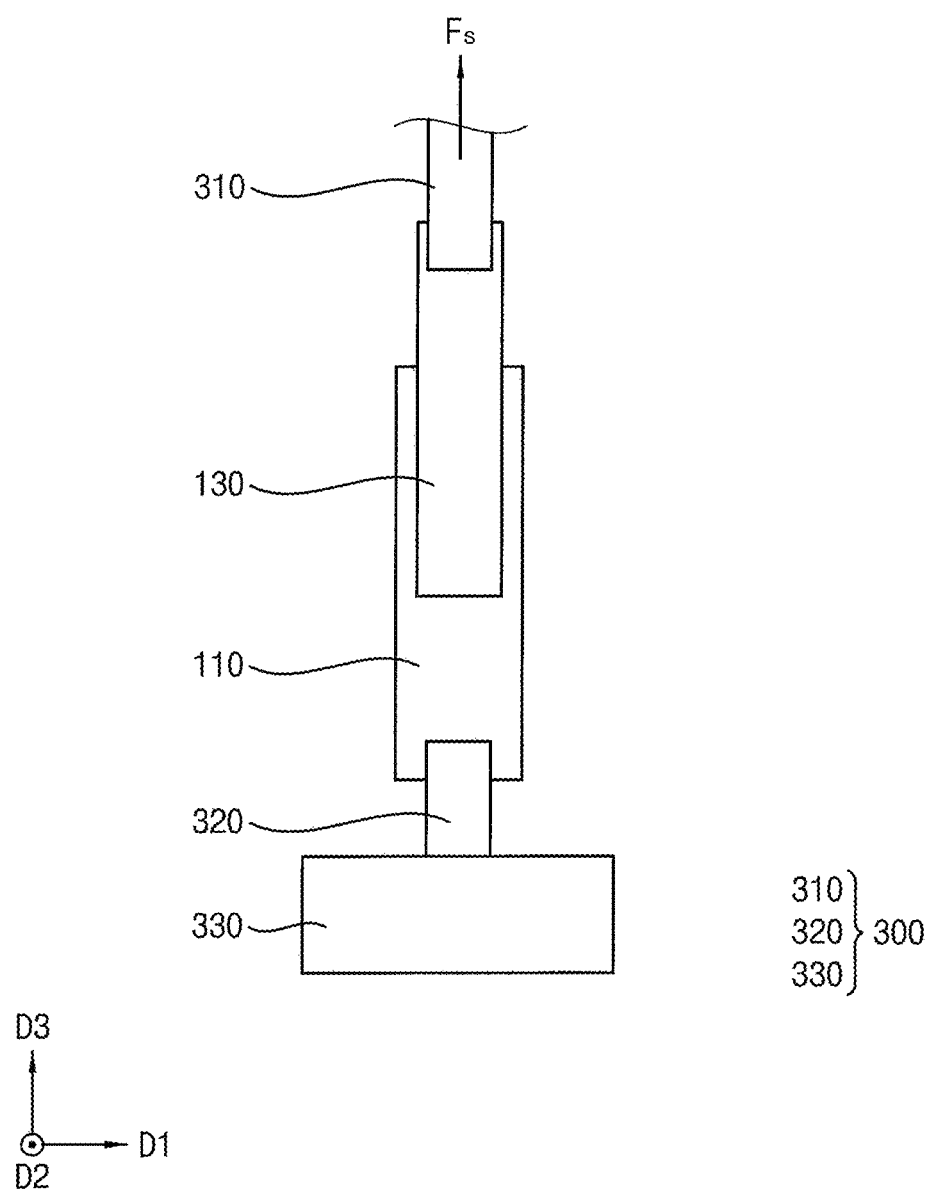
Figure 7:
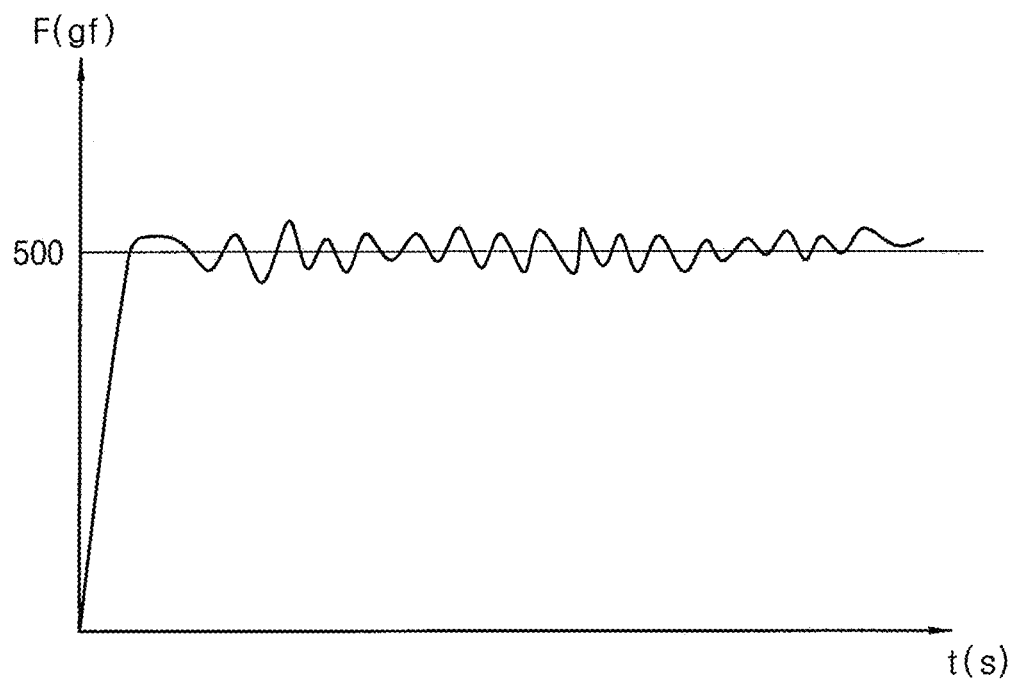
Figure 8:
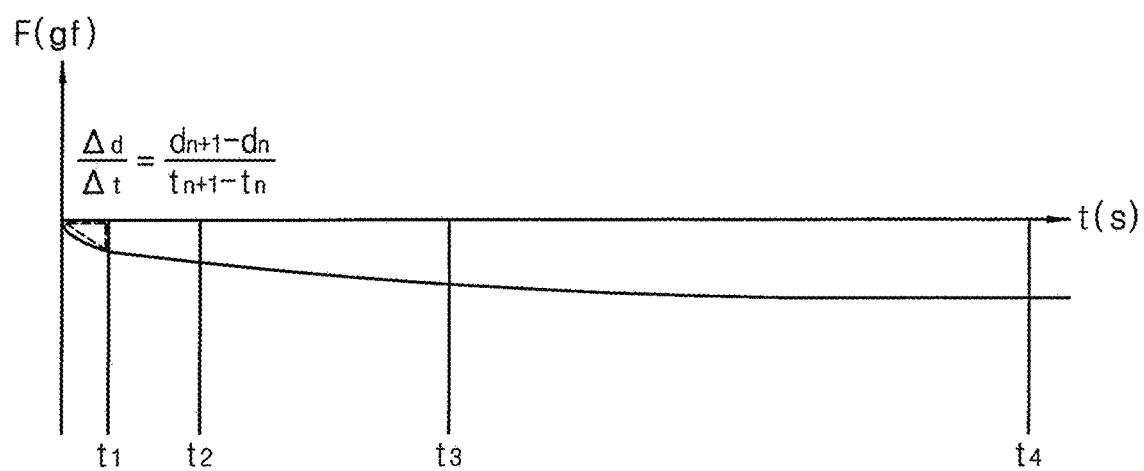

FIG. 5 is a front view showing the substrate 110, the adhesive member 130, and the measurement device 300 to explain a reference force $F_S$ applied to the adhesive member 130, and FIG. 6 is a left side view showing the substrate 110, the adhesive member 130, and the measurement device 300 of FIG. 5. In addition, FIG. 7 is a graph of a reference force $F_S$ (gram-force) versus time (second). The reference force $F_S$ is a measured force for pulling the second portion 132 of the adhesive member 130 fixed in the first fixing part 310 of the measurement device 300. FIG. 8 is a graph obtained through the measurement device 300 by measuring a variation $\Delta d$ of a distance $d_n$ according to a variation $\Delta t$ of a time $t_n$.

The second portion 132 of the adhesive member 130 fixed by the first fixing part 310 of the measurement device 300 may be pulled with a reference force $F_S$ (S540). In embodiments, the reference force $F_S$ may be approximately $10^{-1}$ of the adhesive strength of the adhesive member 130 applied to the substrate 110. For example, adhesive strength of an adhesive member 130, such as a protective film, an optical clear adhesive ("OCA"), a pressure-sensitive adhesive ("PSA"), an optical clear resin ("OCR"), an anisotropic conducting film ("ACF"), and a double-sided fixing tape, which is generally included in a display device, may be 5000 gf/mm or less, and an adhesive member 130 (or a bonding member) having adhesive strength of 5000 gf/mm or less may have a Young's modulus of 1 gigapascal (GPa) or less at room temperature upon rheological evaluation. In this case, linear viscoelasticity properties at a level of 1/10 of the adhesive strength may be measured. Therefore, in a general case, the reference force $F_S$ is defined as a $10^{-1}$ level of the adhesive strength of the adhesive member 130. Therefore, since the adhesive strength of the adhesive member 130 is approximately 5000 gf/25 mm, the reference force $F_S$ may be set to 500 gf/25 mm.

In other embodiments, the reference force $F_S$ may be set to be equal to the adhesive strength of the adhesive member 130. For example, the reference force $F_S$ may be defined equal to the adhesive strength of the adhesive member 130 according to design characteristics of a display device to which the adhesive member 130 is applied.

As shown in FIG. 7, when pulling the second portion 132 of the adhesive member 130 fixed to the first fixing part 310 of the measurement device 300 with the reference force $F_S$, the pulling force may increase from 0 to the reference force $F_S$ (e.g., approximately 500 gf/25 mm), and the reference force $F_S$ may be maintained constant after a predetermined time.

As shown in FIG. 8, while pulling the second portion 132 of the adhesive member 130 fixed in the first fixing part 310 of the measurement device 300 with the reference force $F_S$, the measurement device 300 may measure a distance $d_n$ by which the first portion 131 of the adhesive member 130 is detached from the substrate 110 according to a time $t_n$ (S550). In addition, the measurement device 300 may determine a time interval in which a ratio of a variation $\Delta d$ of the distance $d_n$ to a variation $\Delta t$ of the time $t_n$ is $10^{-5}$ or less (S560). In other words, an inclination of the graph shown in FIG. 8 may be determined by the following Mathematical formula 1.

$$\frac{\Delta d}{\Delta t} = \frac{d_{n+1} - d_n}{t_{n+1} - t_n} \qquad \text{[Mathematical Formula 1]}$$

The measurement device 300 may determine a fourth interval ($t_3$-$t_4$) that is a time interval in which the inclination is 0.00001. Accordingly, a time interval in which the inclination is 0.00001 or less may be a first interval (0-$t_1$), a second interval ($t_1$-$t_2$), and a third interval ($t_2$~$t_3$). In this case, the first interval (0-$t_1$) may be defined as a substrate influence interval, the second interval ($t_1$-$t_2$) may be defined as an unstable adhesive strength interval, the third interval ($t_2$~$t_3$) may be defined as an adhesive strength convergence interval, and the fourth interval ($t_3$-$t_4$) may be defined as a stable adhesive strength interval. Alternatively, the first interval (0-$t_1$), the second interval ($t_1$-$t_2$), and the third interval ($t_2$~$t_3$) may be defined as unstable adhesive strength intervals, and the fourth interval ($t_3$-$t_4$) may be defined as a stable adhesive strength interval. In embodiments, a time interval 0-$t_3$, the sum of the first interval (0-$t_1$), the second interval ($t_1$-$t_2$), and the third interval ($t_2$~$t_3$), which are intervals in which the inclination is 0.00001 or less, may be set as an evaluation time $t_e$ (S570). For example, when the adhesive member 130 having the adhesive strength of approximately 5000 gf/25 mm is used, the reference force $F_S$ may be set to 500 gf/25 mm, and the evaluation time $t_e$ may be set to 180 seconds.

Experimentally, when a distance variation per second is 0.00001, the distance variation after 24 hours was approximately 0.864 mm, and since the distance variation $\Delta d$ is smaller than 1 mm, which is a criterion for determining a defect of the adhesive member included in the display device, the inclination was set to $10^{-5}$. However, the criterion for determining the defect may vary according to the design characteristics to which the adhesive member is applied. In this case, the inclination may be less than or greater than 0.00001.

As described above, the evaluation time $t_e$ in the method of measuring the adhesive strength shown in FIGS. 1 to 8 and 18 may be set.

Figure 9:
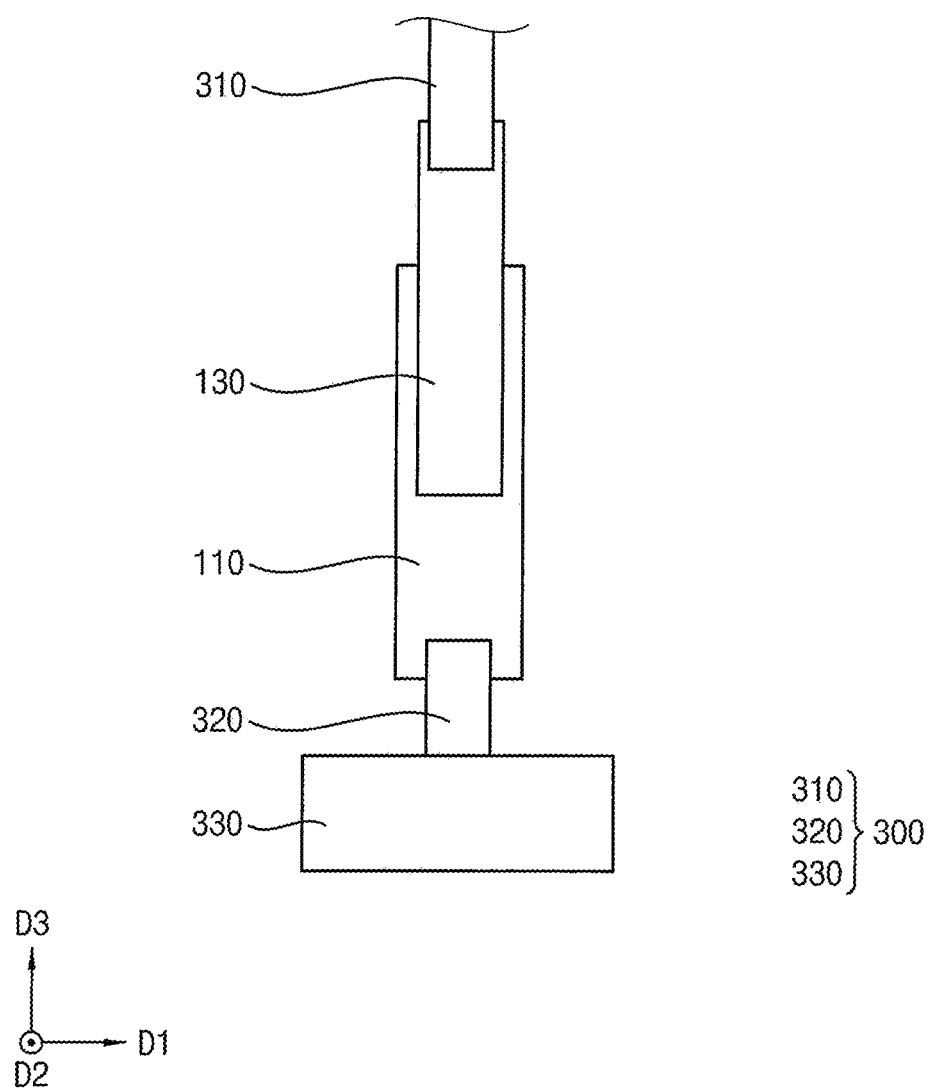
Figure 10:
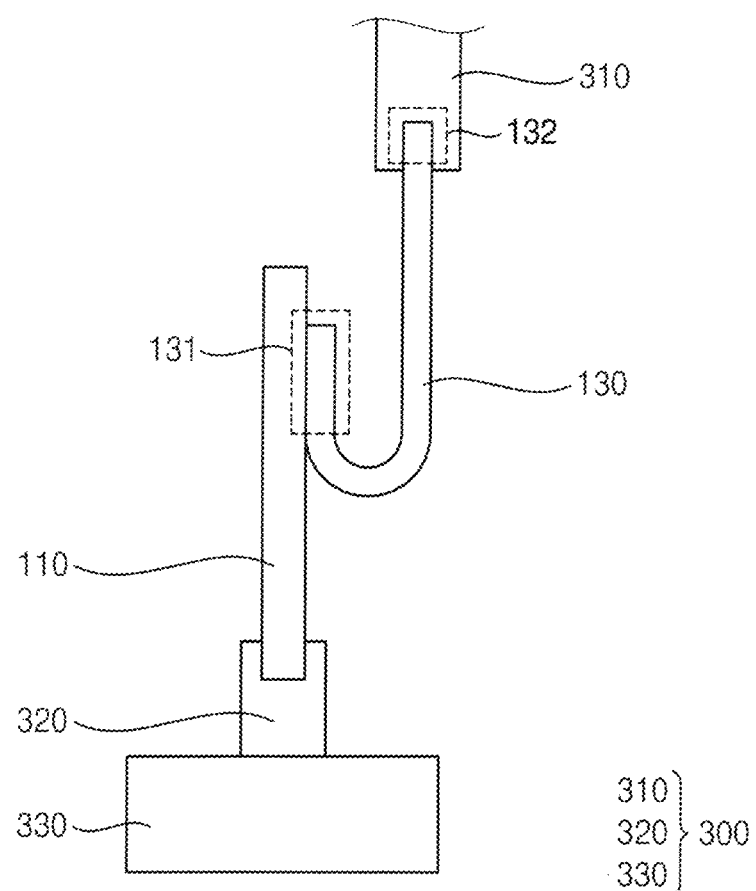

Referring to FIGS. 9, 10, and 19, FIG. 9 is a front view showing an embodiment of the substrate 110, the adhesive member 130, and the measurement device 300 to explain a step in a method for determining of a reference measurement force, and FIG. 10 is a left side view showing the substrate 110, the adhesive member 130, and the measurement device 300 of FIG. 9.

After the evaluation time $t_e$ is set, the substrate 110 and the adhesive member 130 may be re-fixed to the measurement device 300 (S610). In other words, the first portion 131 of the adhesive member 130 may be adhered to the substrate 110, the second portion 132 of the adhesive member 130 may be fixed to the first fixing part 310 of the measurement device 300, and the substrate 110 may be fixed to the second fixing part 320 of the measurement device 300. For example, the first portion 131 of the adhesive member 130 may be adhered to the substrate 110 such that the first portion 131 of the adhesive member 130 may be adhered to a part of the top surface of the substrate 110 by the adhesive strength of the adhesive member 130, and the portion adjacent to the first portion 131 of the adhesive member 130 may be bent such that the second portion 132 of the adhesive member 130 may be fixed to the first fixing part 310 of the measurement device 300. In addition, the second fixing part 320 of the measurement device 300 may be fixed to the measurement device 300, and the second fixing part 320 may fix the substrate 110.

Figure 11:
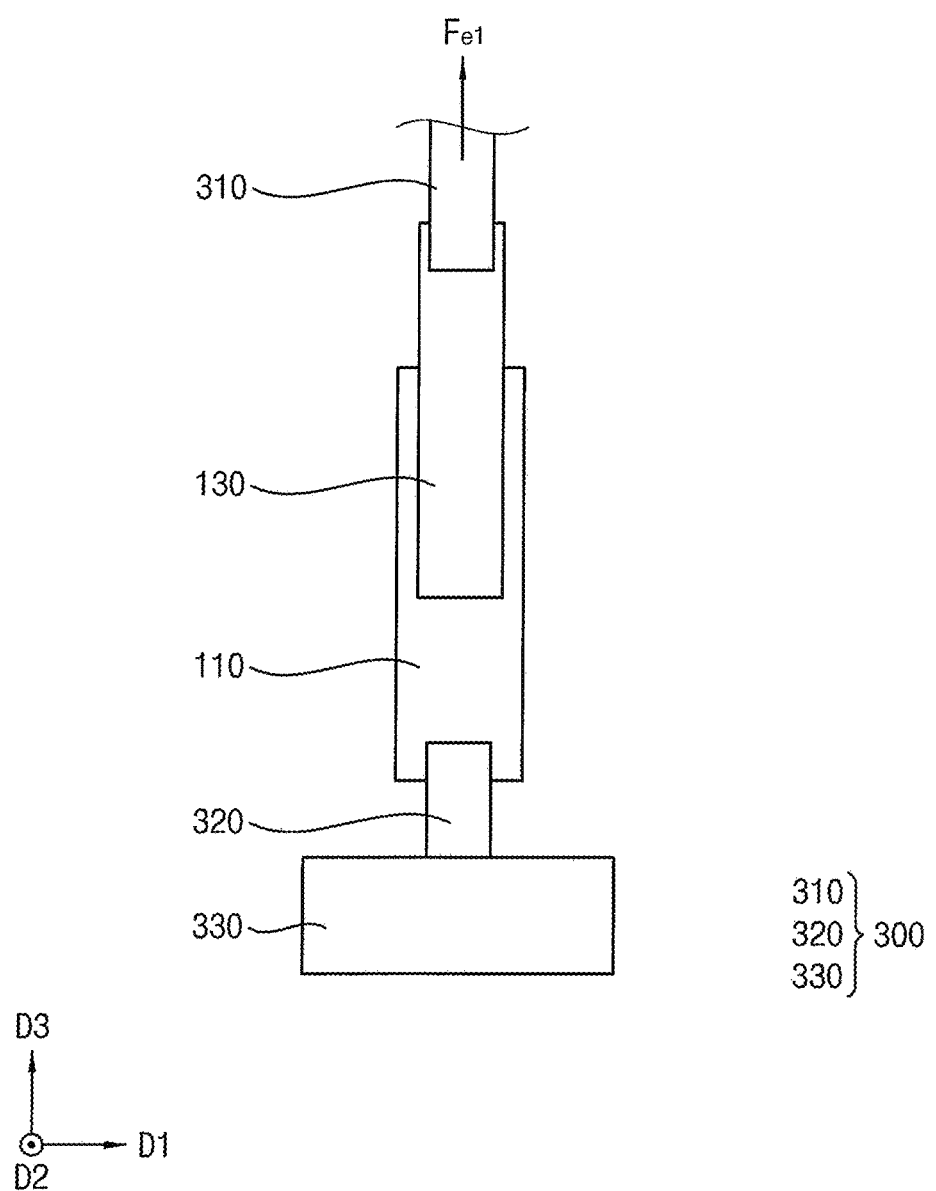
Figure 12:
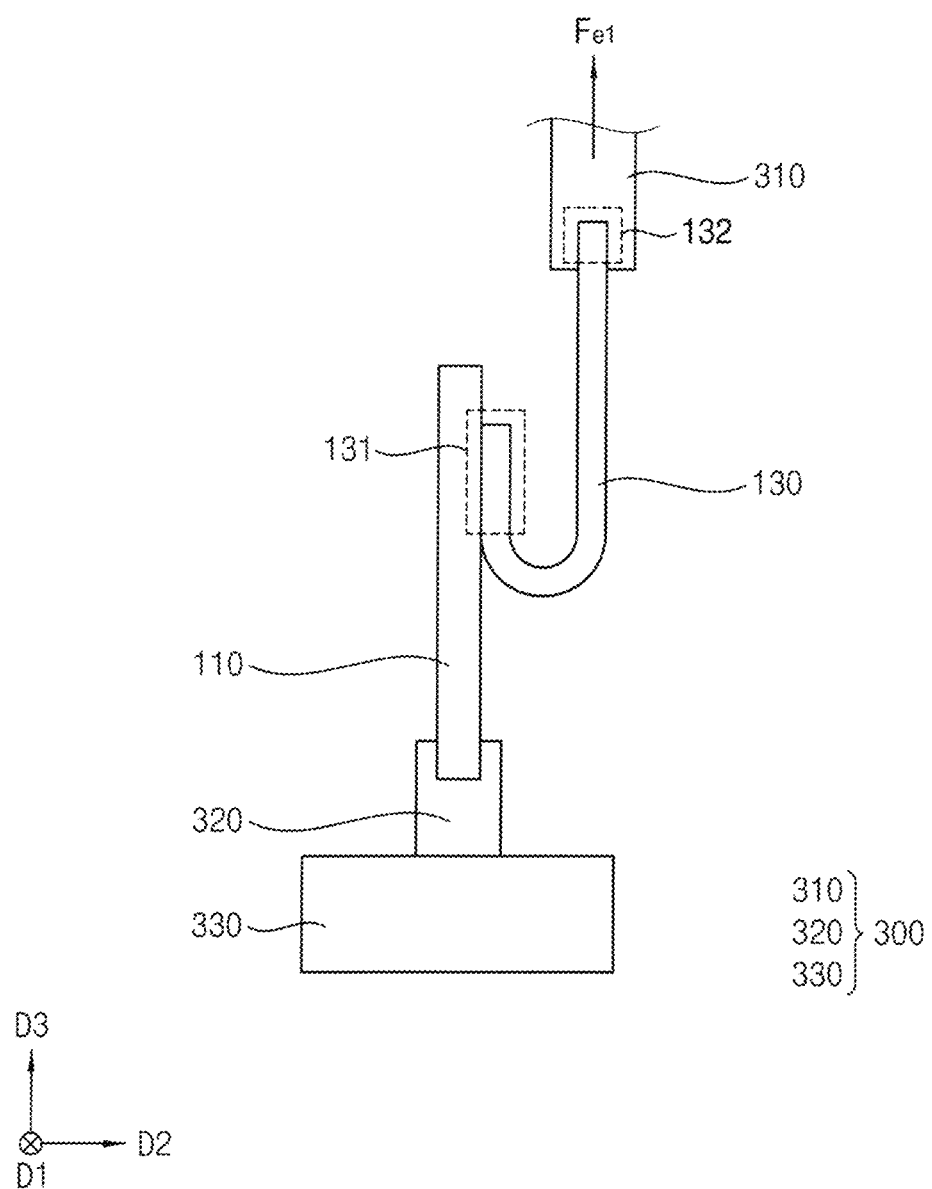

FIG. 11 is a front view showing the substrate 110, the adhesive member 130, and the measurement device 300 to explain another step in the method for determining of a reference measurement force, and FIG. 12 is a left side view showing the substrate 110, the adhesive member 130, and the measurement device 300 of FIG. 11. In addition, FIG. 17 is a graph of a detached distance (millimeter) versus measurement force (gram-force). The first to $n^{th}$ measurement forces $F_{e1}, \ldots,$ and $F_{en}$ are measured forces obtained by pulling the second portion 132 of the adhesive member 130 fixed by the first fixing part 310 of the measurement device 300 for the evaluation time $t_e$.

The adhesive member 130 fixed to the measurement device 300 may be pulled with the first measurement force $F_{e1}$ (e.g., a static force) for the evaluation time $t_e$ (e.g., 180 seconds) (S620). In embodiments, the first measurement force $F_{e1}$ may be approximately 100 gf/25 mm. For example, when pulling the adhesive member 130 fixed to the measurement device 300 with the first measurement force $F_{e1}$ for the evaluation time $t_e$ (e.g., 180 seconds), the pulling force may increase from 0 to the first measurement force $F_{e1}$ (e.g., 100 gf/25 mm), and the first measurement force $F_{e1}$ may be maintained constant during the evaluation time $t_e$.

While pulling the adhesive member 130 fixed to the measurement device 300 with the first measurement force $F_{e1}$ for the evaluation time $t_e$ (e.g., 180 seconds), the measurement device 300 may measure a distance by which the first portion 131 of the adhesive member 130 is detached from the substrate 110 (S630). FIG. 17 shows the distance by which the first portion 131 of the adhesive member 130 is detached from the substrate 110 when pulling with the first measurement force $F_{e1}$.

After the measurement device 300 measures the distance by which the first portion 131 of the adhesive member 130 is detached from the substrate 110, the measurement device 300 may compare the measured distance by which the first portion 131 of the adhesive member 130 is detached from the substrate 110 with a preset distance $d_r$ (S640).

As described above, experimentally, when the criterion for determining the defect of the adhesive member included in the display device is 1 mm, the preset distance $d_r$ may be set to 1 mm, for example. However, the criterion for determining the defect may vary according to application for the adhesive member, structural constraints, design characteristics, and the like. In this case, the preset distance $d_t$ may be less than or greater than 1 mm.

Figure 13:
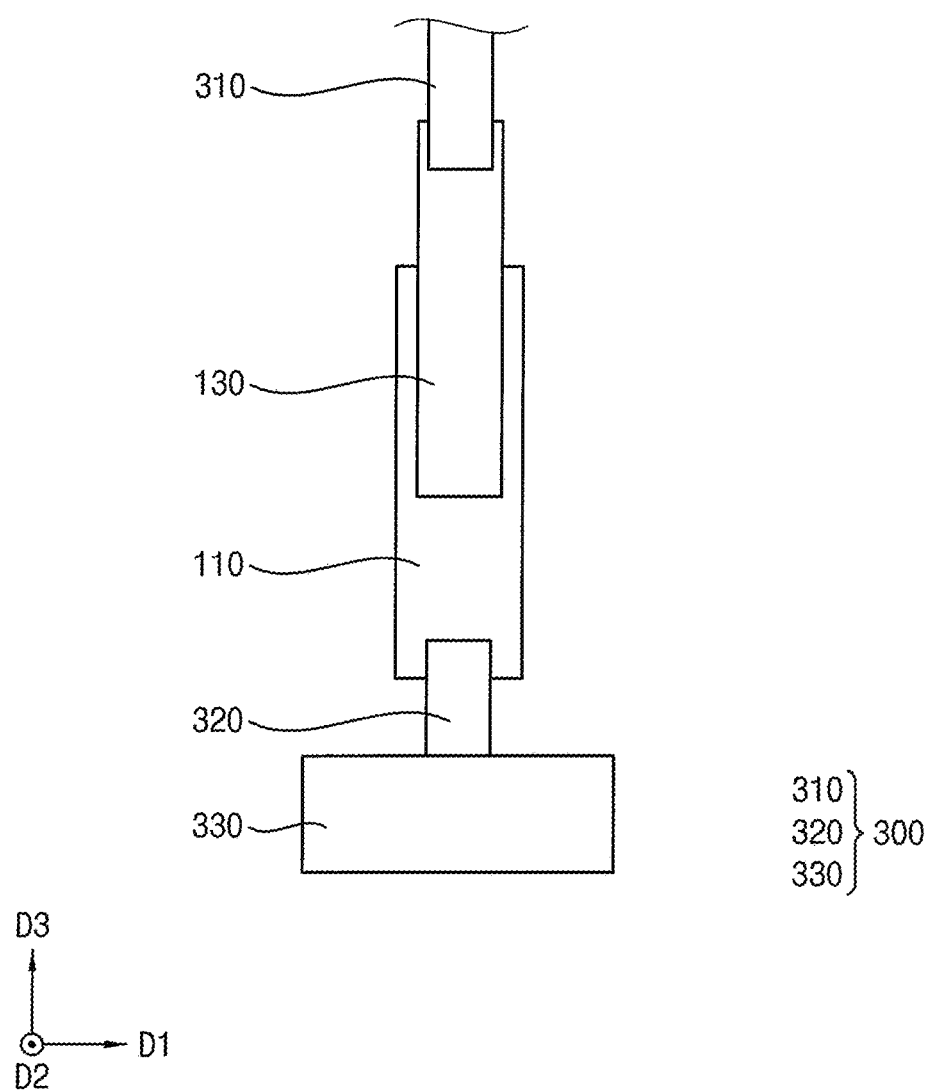
Figure 14:
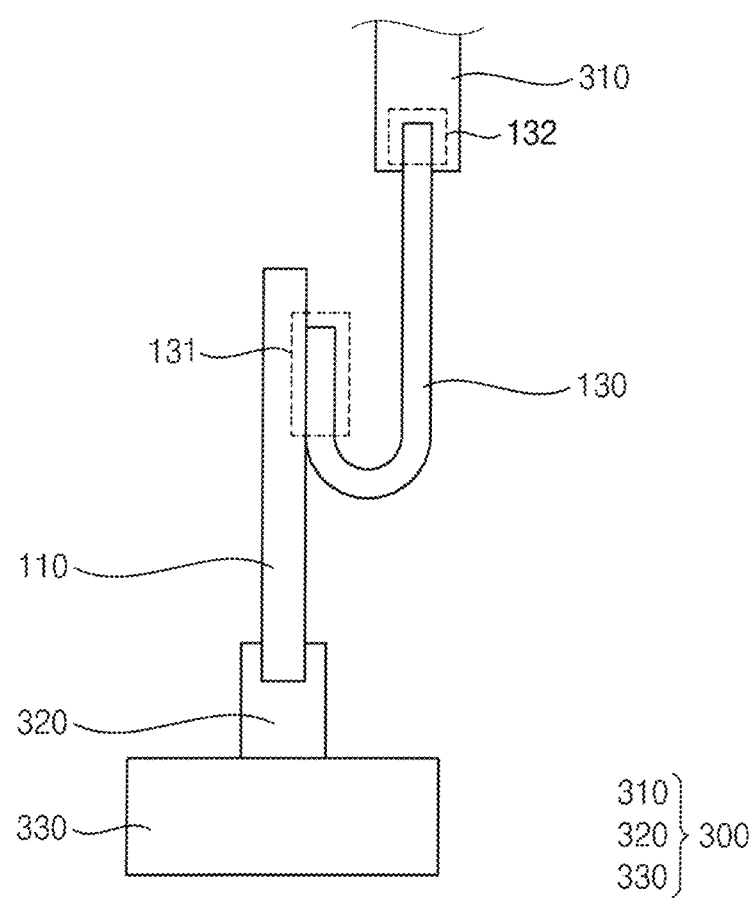

FIG. 13 is a front view showing the substrate 110, the adhesive member 130, and the measurement device 300 to explain still another step in the method for determining of the reference measurement force, and FIG. 14 is a left side view showing the substrate 110, the adhesive member 130, and the measurement device 300 of FIG. 13.

After the distance by which the first portion 131 of the adhesive member 130 is detached from the substrate 110 with the first measurement force $F_{e1}$ is measured, the substrate 110 and the adhesive member 130 may be re-fixed to the measurement device 300 (S650). In other words, the first portion 131 of the adhesive member 130 may be adhered to the substrate 110, the second portion 132 of the adhesive member 130 may be fixed to the first fixing part 310 of the measurement device 300, and the substrate 110 may be fixed to the second fixing part 320 of the measurement device 300. For example, the first portion 131 of the adhesive member 130 may be adhered to the substrate 110 such that the first portion 131 of the adhesive member 130 may be adhered to a part of the top surface of the substrate 110 by the adhesive strength of the adhesive member 130, and the portion adjacent to the first portion 131 of the adhesive member 130 may be bent such that the second portion 132 of the adhesive member 130 may be fixed to the first fixing part 310 of the measurement device 300. In addition, the second fixing part 320 of the measurement device 300 may be fixed to the measurement device 300, and the second fixing part 320 may fix the substrate 110.

Figure 15:
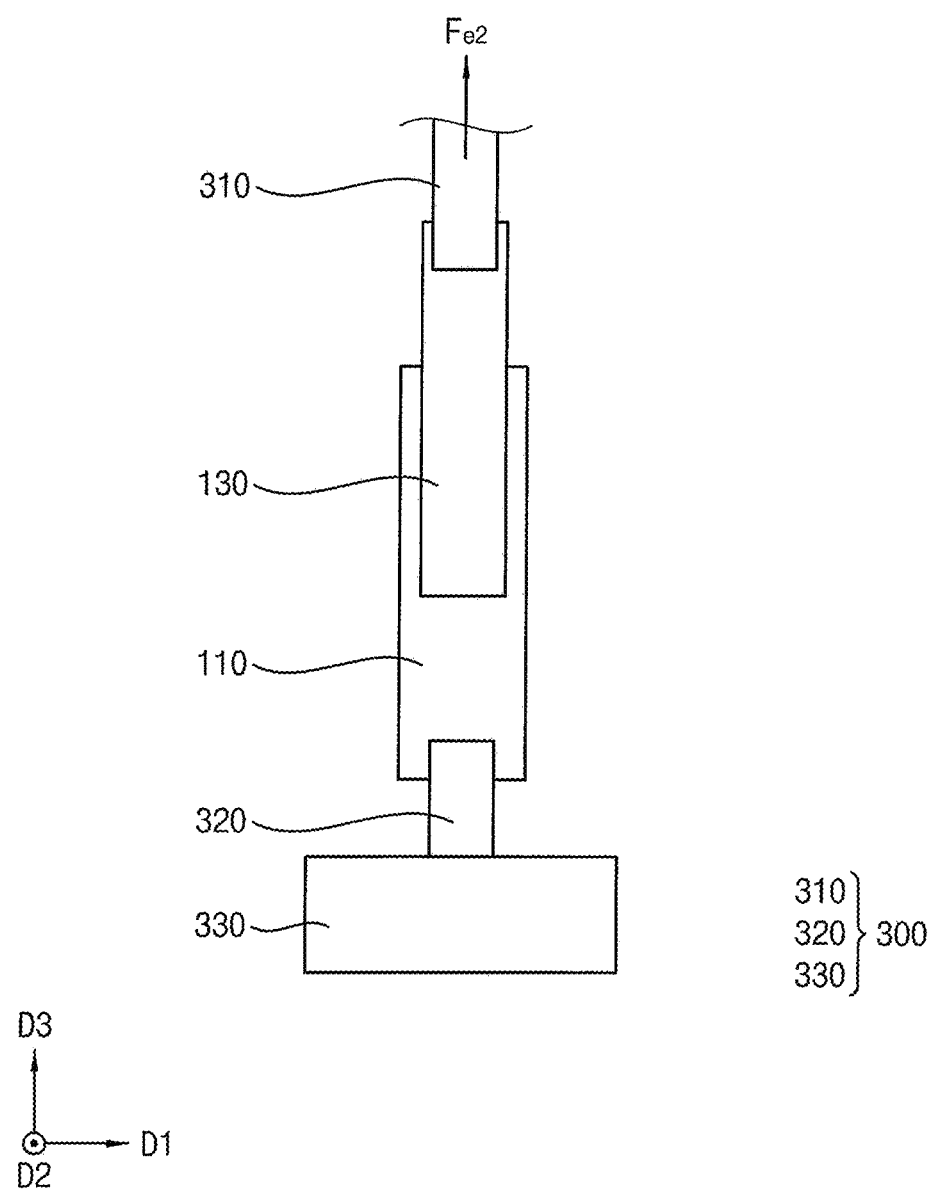
Figure 16:
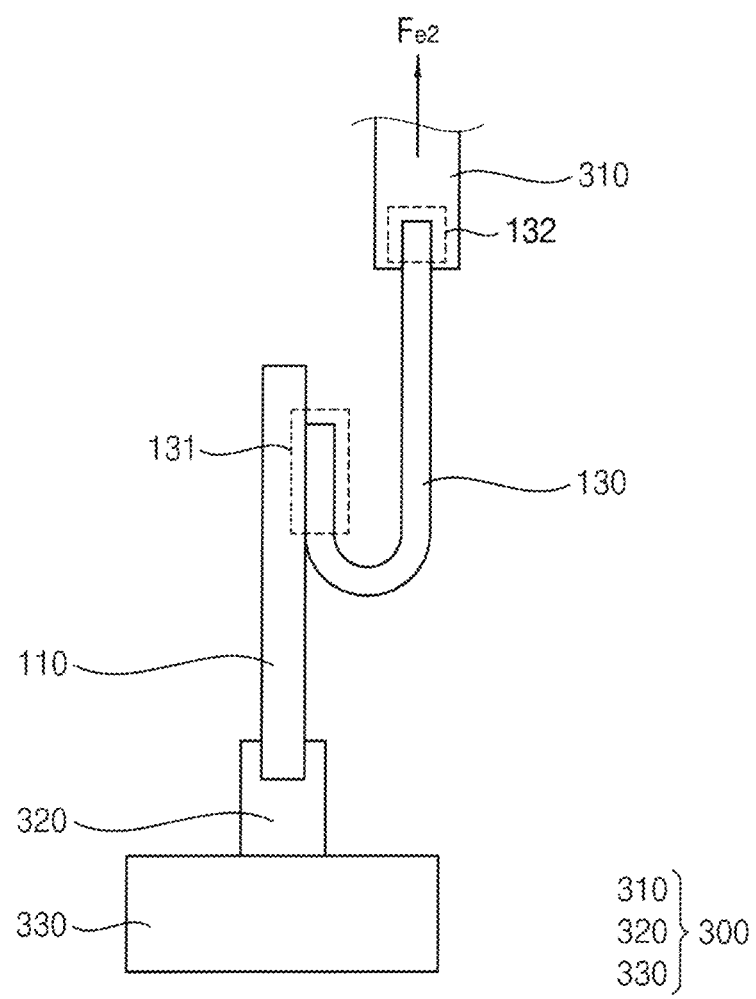

FIG. 15 is a front view showing the substrate 110, the adhesive member 130, and the measurement device 300 to explain yet another step in the method for determining of the reference measurement force, and FIG. 16 is a left side view showing the substrate 110, the adhesive member 130, and the measurement device 300 of FIG. 15.

The adhesive member 130 fixed to the measurement device 300 may be pulled with the second measurement force $F_{e2}$ (e.g., a static force), which is obtained by increasing the first measurement force $F_{e1}$ by a preset amount (e.g., 100 gf/25 mm), for the evaluation time $t_e$ (e.g., 180 seconds) (S660). In embodiments, the second measurement force $F_{e2}$ may be approximately 200 gf/25 mm. For example, when pulling the adhesive member 130 fixed to the measurement device 300 with the second measurement force $F_{e2}$ for the evaluation time $t_e$ (e.g., 180 seconds), the pulling force may increase from 0 to the second measurement force $F_{e2}$ (e.g., 200 gf/25 mm), and the second measurement force $F_{e2}$ may be maintained constant during the evaluation time $t_e$.

While pulling the adhesive member 130 fixed to the measurement device 300 with the second measurement force $F_{e2}$ for the evaluation time $t_e$ (e.g., 180 seconds), the measurement device 300 may measure a distance by which the first portion 131 of the adhesive member 130 is detached from the substrate 110 (S670). FIG. 17, shows the distance by which the first portion 131 of the adhesive member 130 is detached from the substrate 110 when pulling with the second measurement force $F_{e2}$.

After the measurement device 300 measures the distance by which the first portion 131 of the adhesive member 130 is detached from the substrate 110, the measurement device 300 may compare the measured distance by which the first portion 131 of the adhesive member 130 is detached from the substrate 110 with the preset distance $d_t$ (S680).

Referring to FIG. 17, the third measurement force $F_{e3}$, the fourth measurement force $F_{e4}$, . . . , and the $n^{th}$ measurement force $F_{en}$ may be measured in the same manner as described above. For example, the third measurement force $F_{e3}$ may be approximately 300 gf/25 mm, the fourth measurement force $F_{e4}$ may be approximately 400 gf/25 mm, and the $n^{th}$ measurement force $F_{en}$ may be approximately 100×n gf/25 mm.

In embodiments, as shown in FIG. 17, a reference static force $F_{es}$ where the distance by which the first portion 131 of the adhesive member 130 is detached from the substrate 110 is equal to the preset distance $d_t$ may be determined (S690). For example, an interval from the first measurement force $F_{e1}$ to the reference measurement force $F_{es}$ may be defined as an adhesion maintenance interval, an interval from the reference measurement force $F_{es}$ to the $(n-1)^{th}$ measurement force $F_{en-1}$ may be defined as an adhesion lifting interval or a sagging generation interval, and an interval from the $(n-1)^{th}$ measurement force $F_{en-1}$ to the $n^{th}$ measurement force $F_{en}$ may be defined as a peeling interval. Alternatively, the interval from the first measurement force $F_{e1}$ to the reference measurement force $F_{es}$ may be defined as an adhesion maintenance interval, and the interval from the reference measurement force $F_{es}$ to the $n^{th}$ measurement force $F_{en}$ may be defined as an interval in which the deformation of the first portion 131 of the adhesive member 130 starts. In embodiments, a process of pulling the adhesive member 130 with the first measurement force $F_{e1}$ to a process of pulling the adhesive member 130 with the $n^{th}$ measurement force $F_{en}$ may be independently performed.

In other embodiments, according to a type of the adhesive member 130, the first measurement force $F_{e1}$ may be less than 100 gf/25 mm, and since the preset amount is relatively small, a difference between the first measurement force $F_{e1}$ and the second measurement force $F_{e2}$ may be relatively small. In this case, the measurement force may be precisely measured.

As described above, the reference measurement force $F_{es}$ in the method of measuring the adhesive strength shown in FIGS. 9 to 17 and 19 may be determined.

According to a conventional method of measuring adhesive strength of an adhesive member, measurement was performed with respect to a simple force as in a peel strength scheme, a probe tack scheme, a shear stress scheme, and a holding power scheme. Conventionally, the adhesive members may be applied to the display device with reference to the above measurement schemes. However, even if the adhesive member selected with reference to the above measurement schemes is applied to the display device, a defect of the adhesive member, such as residues (e.g., remainders) left on an adhesive surface or inability to maintain the adhesive strength when the adhesive member is bent or repeatedly folded, has occurred. In other words, a defect may occur in the adhesive member selected with reference to the above measurement schemes according to application for the adhesive member, structural constraints, design characteristics, and the like.

In the method of measuring the adhesive strength according to embodiments of the present invention, the evaluation time $t_e$ may be set, and the distance by which the first portion 131 of the adhesive member 130 is detached from the substrate 110 with a static force for the evaluation time $t_e$ may be measured, so that the reference measurement force $F_{es}$ of the adhesive member 130 may be determined. The reference measurement force $F_{es}$ may include information on adhesion maintenance capability of the adhesive member 130 as well as information on a force. Accordingly, an appropriate adhesive member 130 may be selected according to application for the adhesive member, structural constraints, and design characteristics by using the method of measuring the adhesive strength, and an adhesion failure of the adhesive member 130 included in the display device may be reduced.

Experimental Example: Evaluation of Adhesive Strength and Reference Measurement Force ($F_{es}$) According to Adhesive Member A laminated structure of each of adhesive members A, B, C, D, E, and F is described in Table 1 below. For example, the adhesive member A may have a laminated structure such as release liner (PET 50 micrometers (μm))/adhesive (12.5 μm)/PET (25 μm)/adhesive (12.5 μm)/release liner (PET 50 μm), and may be used as an FPC fixing tape in a display device. The adhesive member B may have a laminated structure such as release liner (PET 50 μm)/adhesive (27.5 μm)/PET (25 μm)/adhesive (27.5 μm)/release liner (PET 23 μm), and may be used as a double-sided tape in the display device. The adhesive member C may have a laminated structure such as release liner (PET 50 μm)/adhesive (25 μm)/PET (50 μm)/adhesive (25 μm)/release liner (PET 23 μm), and may be used as a double-sided tape in the display device. The adhesive member D may have a laminated structure such as release liner/adhesive/PET/adhesive/release liner, and may be used as an FPC fixing tape in the display device. The adhesive member E may have a laminated structure such as release liner/adhesive (22 μm)/PET (6 μm)/adhesive (22 μm)/release liner, and may be used as a double-sided tape in the display device. The adhesive member F may have a laminated structure such as release liner (PET 50 μm)/adhesive (25 μm)/release liner (PET 25 μm), and may be used a double-sided digitizer tape in the display device.

Peel strength of each of the adhesive members A, B, C, D, E, and F was measured and shown in Table 1 below.

After the evaluation time $t_e$ is set to 3 minutes, the first to $n^{th}$ measurement forces $F_{e1}, \ldots,$ and $F_{en}$ of each of the adhesive members A, B, C, D, E, and F were measured such that the measurement force is increased by 100 gf/25 mm for 3 minutes. Based on the first to $n^{th}$ measurement forces $F_{e1}, \ldots,$ and $F_{en}$, a reference measurement force $F_{es}$ (static force) of each the adhesive members A, B, C, D, E, and F is shown in Table 1 below.

As shown in Table 1, the pill strength and the reference measurement force $F_{es}$ of each of the adhesive members A, B, C, and F were measured to be a similar level. However, the fill strength and the reference measurement force $F_{es}$ of each of the adhesive members D and E showed large differences. In the case of the adhesive member D, the measured pill strength was approximately 1474.9 gf/25 mm, and the measured static force, which is the reference measurement force $F_{es}$, was approximately 300 gf/3 minutes (min). In other words, the peel strength and the static force of the adhesive member D showed remarkable differences, and when the adhesive member D was actually applied to a display device as an FPC fixing tape, a lifting failure occurred. In addition, when the adhesive member D was removed from a substrate, residues remained. Therefore, when an adhesive member selected with reference to only information on a simple force such as pill strength is applied to the display device, there is a high probability of occurrence of defects. Accordingly, when an adhesive member is selected by using a static force that includes information on adhesion maintenance capability, probability of the occurrence of defects in the adhesive member included in the display device may be significantly reduced.

The present invention may be applied to a method of measuring adhesive strength used to select an adhesive member of various electronic devices including a display device. For example, the present invention may be applied to vehicle-display device, a ship-display device, an aircraft-display device, portable communication devices, display devices for display or for information transfer, a medical-display device, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific

TABLE 1

| Classification | A | B | C | D | E | F |
|---|---|---|---|---|---|---|
| Structure | Release Liner (PET 50 μm)/ Adhesive (12.5 μm)/ PET (25 μm/ Adhesive (12.5 μm)/ Release Liner (PET 50 μm) FPC fixing Tape | Release Liner (PET 50 μm)/ Adhesive (27.5 μm)/ PET (25 μm)/ Adhesive (27.5 μm)/ Release Liner (PET 23 μm) Double-sided Tape | Release Liner (PET 50 μm)/ Adhesive (25 μm)/ PET (50 μm)/ Adhesive (25 μm)/ Release Liner (PET 23 μm) Double-sided Tape | Release Liner/ Adhesive/ PET/ Adhesive/ Release Liner FPC fixing Tape | Release Liner/ Adhesive (22 μm)/ PET (6 μm)/ Adhesive (22 μm)/ Release Liner Double-sided Tape | Release Liner (PET 50 μm)/ Adhesive (25 μm)/ Release Liner (PET 25 μm) Double-sided Digitizer Tape |
| SUS surface after Peel-off | — | — | — | Residues | Residues | Residues |
| Peel Strength (gf/25 mm) | 1335 ± 252 | 1605.4 ± 93.5 | 1774 ± 259 | 1474.9 ± 94.4 | 1499 ± 106.8 | 1696.9 ± 192.8 |
| Static Force (gf/3 min) | 1300 ± 50 | 1600 ± 50 | 1100 ± 50 | 300 ± 50 | 400 ± 50 | 1200 ± 50 | embodiments disclosed, and that modifications to the disclosed embodiments, as well as other embodiments, are intended to be included within the scope of the appended claims.

What is claimed is:

1. A method of measuring adhesive strength, the method comprising:
    setting an evaluation time ($t_e$);
    fixing a substrate and an adhesive member to a measurement device;
    pulling the adhesive member fixed to the measurement device with a first measurement force ($F_{e1}$) for the evaluation time ($t_e$);
    pulling the adhesive member fixed to the measurement device with a second measurement force ($F_{e2}$), which is obtained by increasing the first measurement force ($F_{e1}$) by a preset amount, for the evaluation time ($t_e$); and
    determining a reference measurement force ($F_{es}$) which is a static force applied to the adhesive member when a distance by which a first portion of the adhesive member is detached from the substrate is equal to a preset distance ($d_t$).

2. The method of claim 1, further comprising: after the pulling of the adhesive member fixed to the measurement device with the first measurement force ($F_{e1}$) for the evaluation time ($t_e$), measuring the distance by which the first portion of the adhesive member is detached from the substrate.

3. The method of claim 2, further comprising: after the measuring of the distance by which the first portion of the adhesive member is detached from the substrate, comparing the distance by which the first portion of the adhesive member is detached from the substrate with the preset distance ($d_t$).

4. The method of claim 1, wherein, in the pulling of the adhesive member fixed to the measurement device with the first measurement force ($F_{e1}$) for the evaluation time ($t_e$), the pulling force increases from 0 to the first measurement force ($F_{e1}$), and then the first measurement force ($F_{e1}$) is maintained constant during the evaluation time ($t_e$).

5. The method of claim 1, further comprising: before the pulling of the adhesive member fixed to the measurement device with the second measurement force ($F_{e2}$), which is obtained by increasing the first measurement force ($F_{e1}$) by the preset amount, for the evaluation time ($t_e$), re-fixing the substrate and the adhesive member to the measurement device.

6. The method of claim 5, further comprising: after the pulling of the adhesive member fixed to the measurement device with the second measurement force ($F_{e2}$), which is obtained by increasing the first measurement force ($F_{e1}$) by the preset amount, for the evaluation time ($t_e$), measuring the distance by which the first portion of the adhesive member is detached from the substrate.

7. The method of claim 6, further comprising: after the measuring of the distance by which the first portion of the adhesive member is detached from the substrate, comparing the distance by which the first portion of the adhesive member is detached from the substrate with the preset distance ($d_t$).

8. The method of claim 1, wherein, in the pulling of the adhesive member fixed to the measurement device with the second measurement force ($F_{e2}$) for the evaluation time ($t_e$), the pulling force increases from 0 to the second measurement force ($F_{e2}$), and then the second measurement force ($F_{e2}$) is maintained constant during the evaluation time ($t_e$).

9. The method of claim 1, wherein the pulling of the adhesive member with the first measurement force ($F_{e1}$) and the pulling of the adhesive member with the second measurement force ($F_{e2}$) are independently performed.

10. The method of claim 1, wherein, in the pulling of the adhesive member with the first measurement force ($F_{e1}$) and the pulling of the adhesive member with the second measurement force ($F_{e2}$), the first portion of the adhesive member is adhered to a part of a major surface of the substrate through adhesive strength of the adhesive member, a portion adjacent to the first portion of the adhesive member is bent such that a second portion of the adhesive member is fixed to a first fixing part of the measurement device, and the first fixing part pulls the second portion of the adhesive member with the first measurement force ($F_{e1}$) or the second measurement force ($F_{e2}$).

11. The method of claim 1, wherein the setting of the evaluation time ($t_e$) includes:
    adhering the first portion of the adhesive member to the substrate;
    fixing a second portion of the adhesive member to a first fixing part of the measurement device, and fixing the substrate to a second fixing part of the measurement device;
    pulling the second portion of the adhesive member fixed by the first fixing part of the measurement device with a reference force ($F_S$);
    measuring a distance ($d_n$) by which the first portion of the adhesive member is detached from the substrate according to a time ($t_n$);
    determining a time interval in which a ratio of a variation ($\Delta d$) of the distance ($d_n$) to a variation ($\Delta t$) of the time ($t_n$) is $10^{-5}$ or less; and
    setting the evaluation time ($t_e$) based on the time interval.

12. The method of claim 11, wherein the reference force ($F_S$) is $10^{-1}$ of adhesive strength of the adhesive member.

13. The method of claim 11, wherein the reference force ($F_S$) is equal to adhesive strength of the adhesive member.

14. The method of claim 11, wherein, in the pulling of the second portion of the adhesive member fixed by the first fixing part of the measurement device with the reference force ($F_S$), the pulling force increases from 0 to the reference force ($F_S$), and then the reference force ($F_S$) is maintained constant.

15. The method of claim 11, wherein the first portion of the adhesive member is adhered to a part of a major surface of the substrate through adhesive strength of the adhesive member,
    a portion adjacent to the first portion of the adhesive member is bent such that the second portion of the adhesive member is fixed to the first fixing part of the measurement device, and
    the first fixing part pulls the second portion of the adhesive member with the reference force ($F_S$).

16. The method of claim 1, further comprising: before the setting of the evaluation time ($t_e$), measuring the adhesive strength of the adhesive member.

17. The method of claim 1, wherein the fixing of the substrate and the adhesive member to the measurement device includes:
    adhering the first portion of the adhesive member to the substrate; and
    fixing a second portion of the adhesive member to a first fixing part of the measurement device, and fixing the substrate to a second fixing part of the measurement device.

18. The method of claim 17, wherein the first portion of the adhesive member is adhered to a part of a major surface of the substrate through adhesive strength of the adhesive member, and a portion adjacent to the first portion of the adhesive member is bent such that the second portion of the adhesive member is fixed to the first fixing part of the measurement device.

19. The method of claim 18, wherein the second fixing part of the measurement device is fixed to the measurement device, the second fixing part of the measurement device fixes the substrate, and the first fixing part of the measurement device pulls the second portion of the adhesive member in a direction parallel to the major surface of the substrate.

20. The method of claim 1, wherein, when the distance by which the first portion of the adhesive member is detached from the substrate is less than or equal to the preset distance ($d_t$), a state in which the first portion of the adhesive member is adhered to the substrate is maintained, and when the distance by which the first portion of the adhesive member is detached from the substrate exceeds the preset distance ($d_t$), deformation of the first portion of the adhesive member starts.

\* \* \* \* \*